Oct. 21, 1952  L. McGIHON  2,614,802
HOIST
Filed Sept. 8, 1947
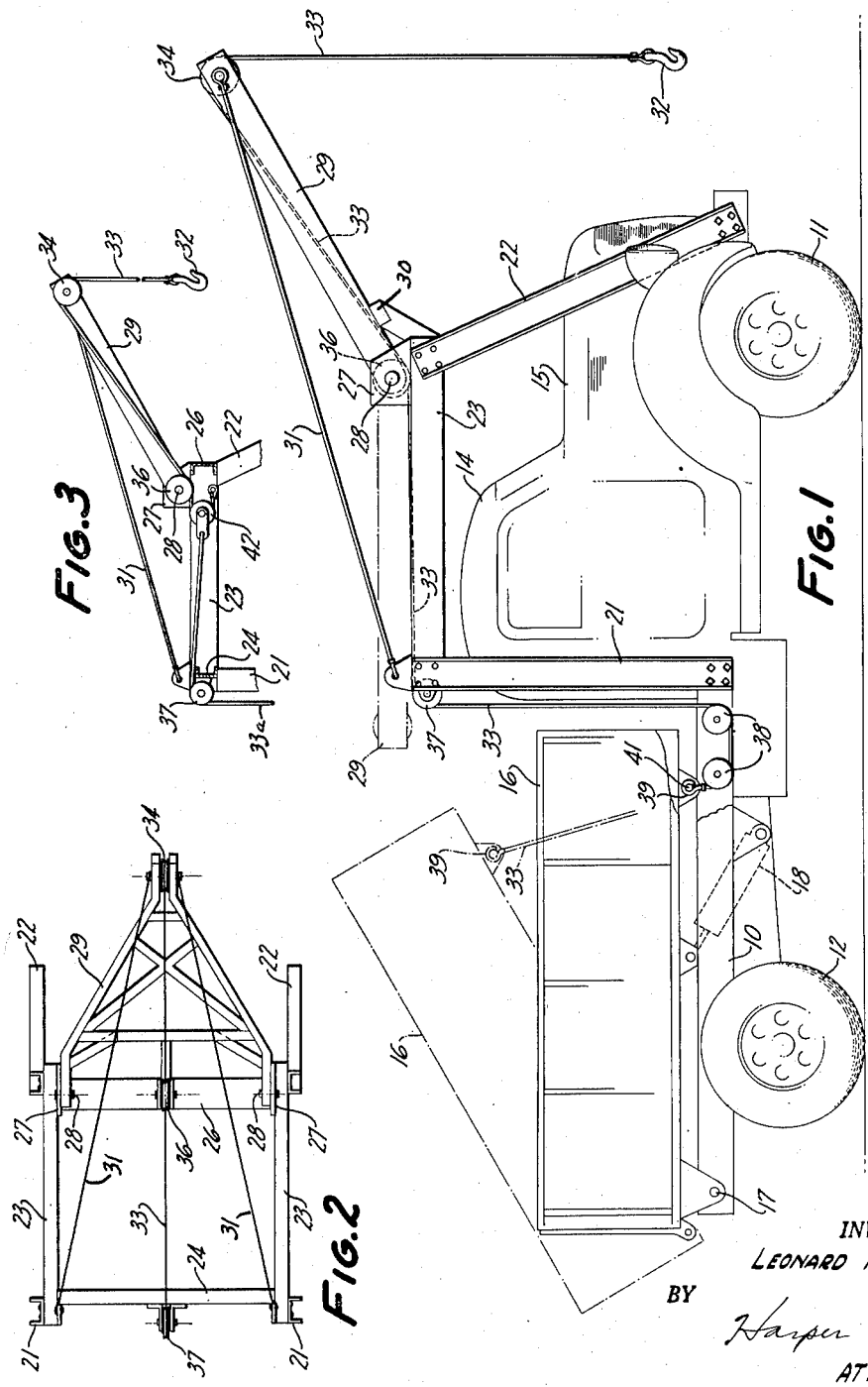
INVENTOR.
LEONARD McGIHON
BY
Harper Allen
ATTORNEY Patented Oct. 21, 1952

2,614,802

UNITED STATES PATENT OFFICE 2,614,802

HOIST

Leonard McGihon, San Leandro, Calif., assignor to King Sales & Engineering Co., San Francisco, Calif., a corporation of California Application September 8, 1947, Serial No. 772,854

5 Claims. (Cl. 254—139.1)

The invention relates to hoists and is concerned more particularly with a hoist attachment for a dump body truck.

It is a general object of the invention to provide a hoist attachment for a truck of the dump body type which can be readily mounted on or dismounted from the truck.

Another object of the invention is to provide a hoist structure of the above character in which the boom is adjustable between an operative working position and an inoperative carrying or travelling position.

Other objects and advantages of the invention will be apparent from the following description of a preferred embodiment thereof as illustrated in the accompanying drawings, in which:

Figure 1 is a side elevational view of a dump body truck having a hoist structure of the instant invention mounted thereon.

Figure 2 is a plan view of the hoist attachment.

Figure 3 is a fragmentary side elevational view illustrating a modified form of cable arrangement for the hoist.

Referring to Figures 1 and 2, there is shown a truck including a frame or chassis 10 having front and rear wheel supports 11 and 12, respectively. The truck is provided with a conventional form of engine structure 13 and a cab structure 14 rearwardly thereof as well as a dump body 16 pivoted on the frame at 17 and having a conventional piston and cylinder operating mechanism 18 associated therewith.

In accordance with the instant invention a hoist attachment is provided for the truck including an auxiliary framework having similar opposite rear standards 21 detachably secured at the lower end to the frame 10 and a similar pair of inclined forward standards 22 similarly attached to the frame. At the upper end the auxiliary frame work includes an upper portion comprising similar side channels 23 secured to the standards 21 and 22 and connected by a rear cross channel 24 and a front cross bracket 26. Adjacent the front end of the side channels 23 a pair of upstanding pivot brackets 27 are provided to receive the pivot bolts 28 for the forwardly converging side members of a boom structure 29. In its forward operative position, the boom 29 engages a stop 30 mounted on the hoist framework. Detachable rod struts 31 are provided for the boom structure 29.

The hoist includes a suitable form of lift device such as a hook 32 from which a cable 33 extends over a sheave 34 at the outer end of the boom, under an idler sheave 36 on the cross piece 26, over a sheave 37 on the rear cross piece 24, and under a pair of sheaves 38 on an intermediate portion of the truck frame 10. The end of the cable 33 is connected by detachable hook 39 to a pin 41 on the dump body 16. When the dump body 16 is elevated from its normal lower position to the dumping position shown in dotted lines in Figure 1 the hook 32 will be raised to elevate a load attached thereto. In operation, the truck with the hoist is useful to lift and transport hoisted loads from place to place as desired.

When the truck is travelling from place to place without requiring use of the hoist, the boom 29 is folded rearwardly to the dotted line position shown in Figure 1 where it will not interfere with maneuvering of the truck or its overhead clearance.

Figure 3 shows a modified form of the invention in which a block and tackle mechanism 42 is provided, including a plurality of loops of the cable 33 to provide an increased amount of travel of the hook 32 for a given amount of travel of the dump body of the truck. A cable 33a extends from the block of the mechanism 42 to the dump body of the truck.

While I have shown certain preferred embodiments of the invention, it will be seen that the invention is capable of variation and modification from the form shown so that its scope should be limited only by the scope of the claims appended hereto.

I claim:

1. A hoist attachment for a dump body truck having a chassis and a cab and engine structure on the chassis, comprising a framework detachably mounted to each side of the chassis at points forwardly and rearwardly of the cab and engine structure thereof, said framework including an elevated portion located above the cab, a boom pivotally mounted on the elevated portion of the framework for movement between a forwardly projecting operative position and a rearwardly projecting inoperative position, and lift means including a cable mechanism extending over the boom and connected to the dump body of the truck for operation thereby.

2. A hoist attachment for a dump body truck having a chassis and a cab and engine structure on the chassis, comprising a generally rectangular framework having a plurality of standards at each side supported on the chassis and an upper frame portion disposed above the cab and engine structure, and a boom structure pivotally mounted at said upper frame portion of the framework and converging forwardly therefrom, said boom structure being mounted for folding movement rearwardly to a carrying position thereof, and a stop carried by said upper frame portion for said boom in the forwardly projecting operative position thereof.

3. A hoist attachment for a dump body truck having a chassis and a cab and engine structure on the chassis, comprising a framework detachably mounted to each side of the chassis at points forwardly and rearwardly of the cab and engine structure thereof and including an upper frame portion positioned above the cab and engine structure, a boom pivotally mounted at the forward end of the upper frame portion for movement between a forwardly projecting operative position and a rearwardly projecting horizontal inoperative position, and means including a block and tackle mechanism mounted in said upper frame portion and having its cable extending over the boom, the block of said block and tackle mechanism being connected to the dump body of the truck for operation thereby.

4. A hoist attachment for a dump body truck having a chassis and a cab and engine structure on the chassis, comprising a generally rectangular framework having a plurality of standards at each side supported on the chassis and an upper frame portion disposed above the cab and engine structure, and a boom structure pivotally mounted at the forward end of said upper frame portion and converging forwardly therefrom, said boom structure being mounted for folding movement rearwardly to a horizontal carrying position thereof resting on said upper frame portion, and a stop carried by said upper frame portion for said boom in the forwardly projecting operative position thereof.

5. A hoist attachment for a dump body truck having an operator's station, comprising an elevated framework over said operator's station and supported on said truck, and a boom pivotally mounted on such elevated portion of said framework above the operator's line of vision for folding movement from a forwardly projecting operative position above said operator's station to a rearward carrying position over said elevated framework.

LEONARD McGIHON.

REFERENCES CITED

The following references are of record in the file of this patent:

UNITED STATES PATENTS

| Number | Name | Date |
|---|---|---|
| 718,897 | Arsneau | Jan. 20, 1903 |
| 980,791 | Kennedy | Jan. 3, 1911 |
| 1,897,383 | Burgoyne | Feb. 14, 1933 |
| 2,258,383 | Haniquet | Oct. 7, 1941 |
| 2,438,277 | Fife et al. | Mar. 23, 1948 |